United States Patent [19]

Chatterjee et al.

[11] Patent Number: 5,428,208
[45] Date of Patent: Jun. 27, 1995

[54] METHOD OF INDUCTION CASE HARDENING A RACK BAR

[75] Inventors: Madhu S. Chatterjee, Huntsville, Ala.; William I. Stuehr, North Royalton, Ohio

[73] Assignee: General Motors Corporation, Detroit, Mich.

[21] Appl. No.: 340,782

[22] Filed: Nov. 17, 1994

[51] Int. Cl.⁶ .............................. H05B 6/40; C21D 9/32
[52] U.S. Cl. ............................ 219/635; 219/639; 219/672; 219/674; 219/656; 148/573
[58] Field of Search .............. 219/635, 637, 639, 640, 219/672, 674, 656; 148/573, 572, 574

[56] References Cited

U.S. PATENT DOCUMENTS

| | | | |
|---|---|---|---|
| 2,294,413 | 4/1939 | Marshall | 148/10 |
| 2,452,197 | 3/1945 | Kennedy | 219/13 |
| 3,125,655 | 3/1964 | McBrien et al. | 219/637 |
| 3,488,236 | 1/1970 | Van Husen, Jr. | 148/573 |
| 3,522,405 | 8/1970 | Seulen et al. | 219/637 |
| 3,737,613 | 6/1973 | Gillock | 219/639 |
| 4,258,241 | 3/1981 | Soworowski | 219/10.71 |
| 4,375,997 | 3/1983 | Matz | 148/150 |
| 4,447,690 | 5/1984 | Grever | 219/639 |
| 4,698,473 | 10/1987 | Alcini et al. | 219/10.79 |
| 5,242,514 | 9/1993 | Wiener et al. | 148/572 |

FOREIGN PATENT DOCUMENTS

| | | |
|---|---|---|
| 59-232216 | 12/1984 | Japan . |
| 61-139625 | 6/1986 | Japan . |
| 62-180017 | 8/1987 | Japan . |
| 63-297524 | 12/1988 | Japan . |
| 03257122 | 11/1991 | Japan . |

*Primary Examiner*—Philip H. Leung
*Attorney, Agent, or Firm*—Saul Schwartz

[57] ABSTRACT

A method of case hardening a steering gear rack bar having a plain cylindrical barrel portion and an integral toothed portion on which are formed a plurality of rack gear teeth each having a predetermined helix angle relative to a longitudinal centerline of the rack bar. The method includes forming an induction coil having a linear section and a spiral section with a helix angle equal to the helix angle of the rack gear teeth, locating the rack bar inside the induction coil with the barrel portion thereof juxtaposed the linear section of the induction coil and with the spiral section of the induction coil surrounding the toothed portion, rotating the rack bar about its longitudinal centerline while passing alternating electric current through the coil to concurrently induction heat both the barrel portion and the toothed portion, and quenching the rack bar after the alternating current is turned off.

3 Claims, 3 Drawing Sheets

METHOD OF INDUCTION CASE HARDENING A RACK BAR

FIELD OF THE INVENTION

This invention relates to a method of case hardening a rack bar for a rack and pinion steering gear.

BACKGROUND OF THE INVENTION

It is well known to case harden a steel workpiece by induction heating and quenching the workpiece. In induction heating, a rapidly fluctuating magnetic field created by alternating current in an electrically conductive coil around the work piece induces electric current flow in the work piece near the surface thereof. The induced current resistively heats a thin layer of the work piece to a high temperature which depends on the power density and the duration of the induction heating cycle. Where the surface of the workpiece is plain, the current flow and the high temperature layer closely follow the surface so that quenching produces a uniformly thin, hard case. Where the surface of the workpiece is undulating, e.g. gear teeth, the induced electric current flows across the roots of the undulations instead of following the surfaces thereof so that the high temperature layer and the corresponding hard case penetrate to the roots of the undulations instead of following the surface thereof. Because of this characteristic, case hardening of rack bars for motor vehicle rack and pinion steering gears, having both plain and toothed portions, includes induction heating of the plain portions and conduction heating of the toothed portions. The combination of induction heating and conduction heating is more expensive than induction heating alone and also requires more extensive post-hardening straightening of the rack bar to achieve conformity with rigorous dimensional specifications.

SUMMARY OF THE INVENTION

This invention is a new and improved method of case hardening a rack bar for a motor vehicle rack and pinion steering gear having a plain cylindrical barrel portion and an integral toothed portion on which are formed a plurality of rack gear teeth each having a predetermined helix angle relative to a longitudinal centerline of the rack bar. The method according to this invention includes forming an induction coil having a linear section and a spiral section with a helix angle equal to the helix angle of the rack gear teeth, locating the rack bar inside the induction coil with the barrel portion thereof juxtaposed the linear section of the induction coil and with the spiral section of the induction coil surrounding the toothed portion, rotating the rack bar about its longitudinal centerline while passing alternating electric current through the coil to concurrently heat both the barrel portion and the toothed portion of the rack bar, and quenching the rack bar after the alternating current is turned off. The linear section of the induction coil induces current in the barrel portion of the rack bar for uniform heating of a thin, high temperature layer thereof and the spiral section induces current in the toothed portion of the rack bar which relatively closely follows the undulations of the rack gear teeth so that a thin, high temperature layer is also formed on the toothed portion which closely follows the undulations of the rack gear teeth.

DESCRIPTION OF A PREFERRED EMBODIMENT

Figure 1:
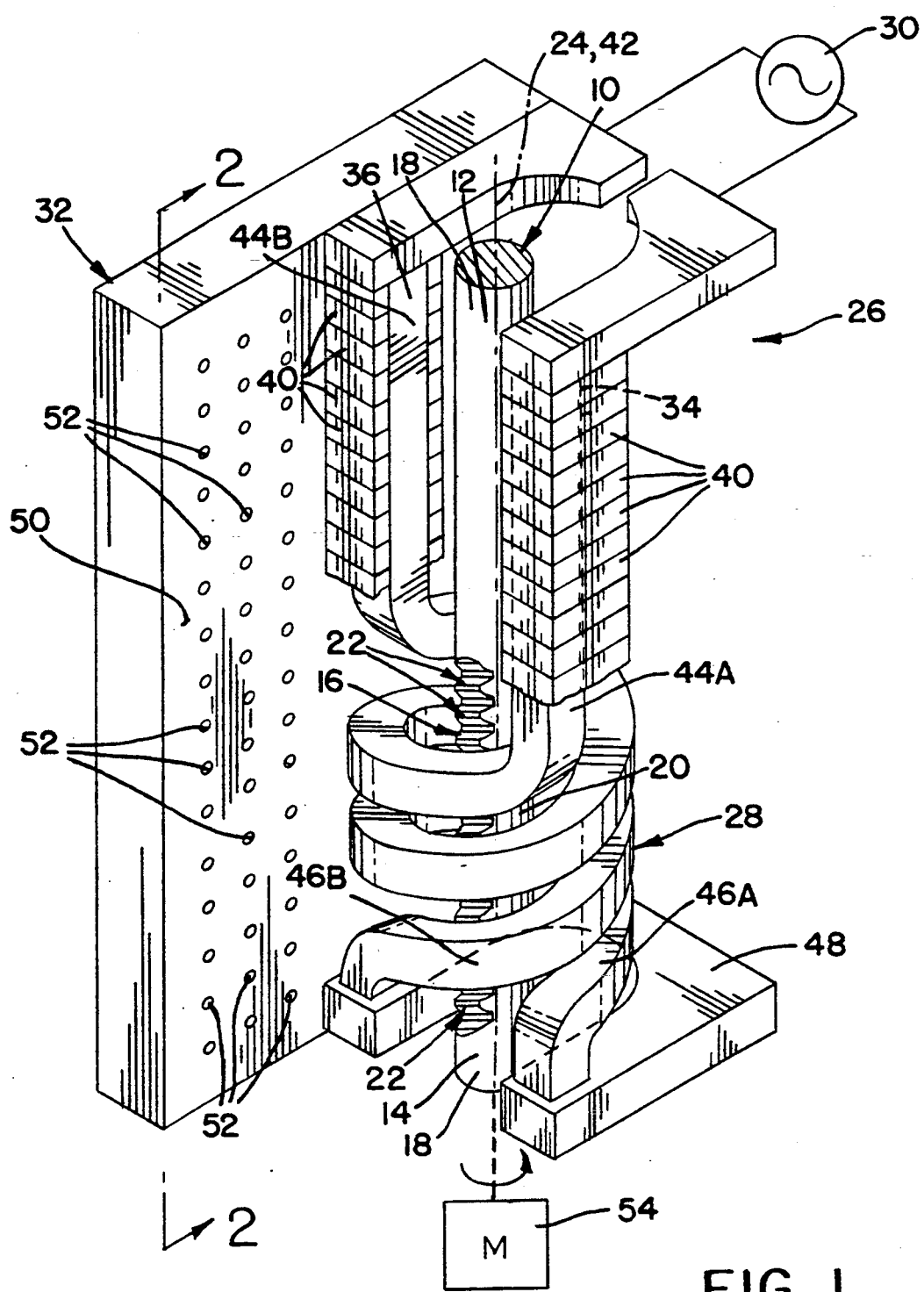
FIG. 1 is a fragmentary perspective view of an induction heating and liquid quenching apparatus for practicing a case hardening method according to this invention.

Referring to the drawings, a rack bar 10 of a motor vehicle rack and pinion steering gear, not shown, includes a long barrel portion 12, a short barrel portion 14, and an integral toothed portion 16 between the long the short barrel portions. The rack bar is made of steel suitable for case hardening by induction heating and quenching, e.g. SAE 1141. Both barrel portions 12, 14 have an uninterrupted, plain cylindrical outer surface 18 symmetric about a longitudinal centerline 24 of the bar. The toothed portion 16 has a plain cylindrical surface 20 contiguous with the outer surfaces 18 of the long and short barrel portions interrupted on one side of the bar by a plurality of rack gear teeth 22 each having a pair of flank surfaces 23A–B on opposite sides thereof and helix angle $\Theta_1$ relative to the longitudinal centerline 24 of the rack bar.

Figure 3:
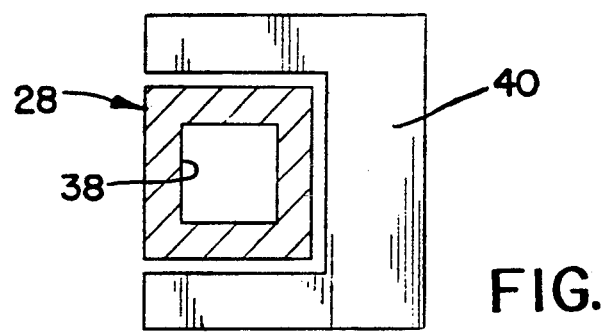
FIG. 3 is a sectional view taken generally along the plane indicated by lines 3—3 in FIG. 2.

An induction heating apparatus 26 includes an induction coil 28, a schematically represented power supply 30, and a fragmentarily illustrated quench manifold 32. As seen best in FIG. 3, the induction coil 28 is a hollow tube having a square cross section which extends from a first end 34 connected to one terminal of the power supply 30 to a second end 36 connected to the other terminal of the power supply. The center of the coil defines a passage 38 for conducting coolant through the induction coil in conventional fashion. A plurality of C-shaped flux concentrators or Ferrotron segments 40 are mounted on the coil 28 along the full length thereof facing inward toward a longitudinal centerline 42 of the coil.

Figure 2:
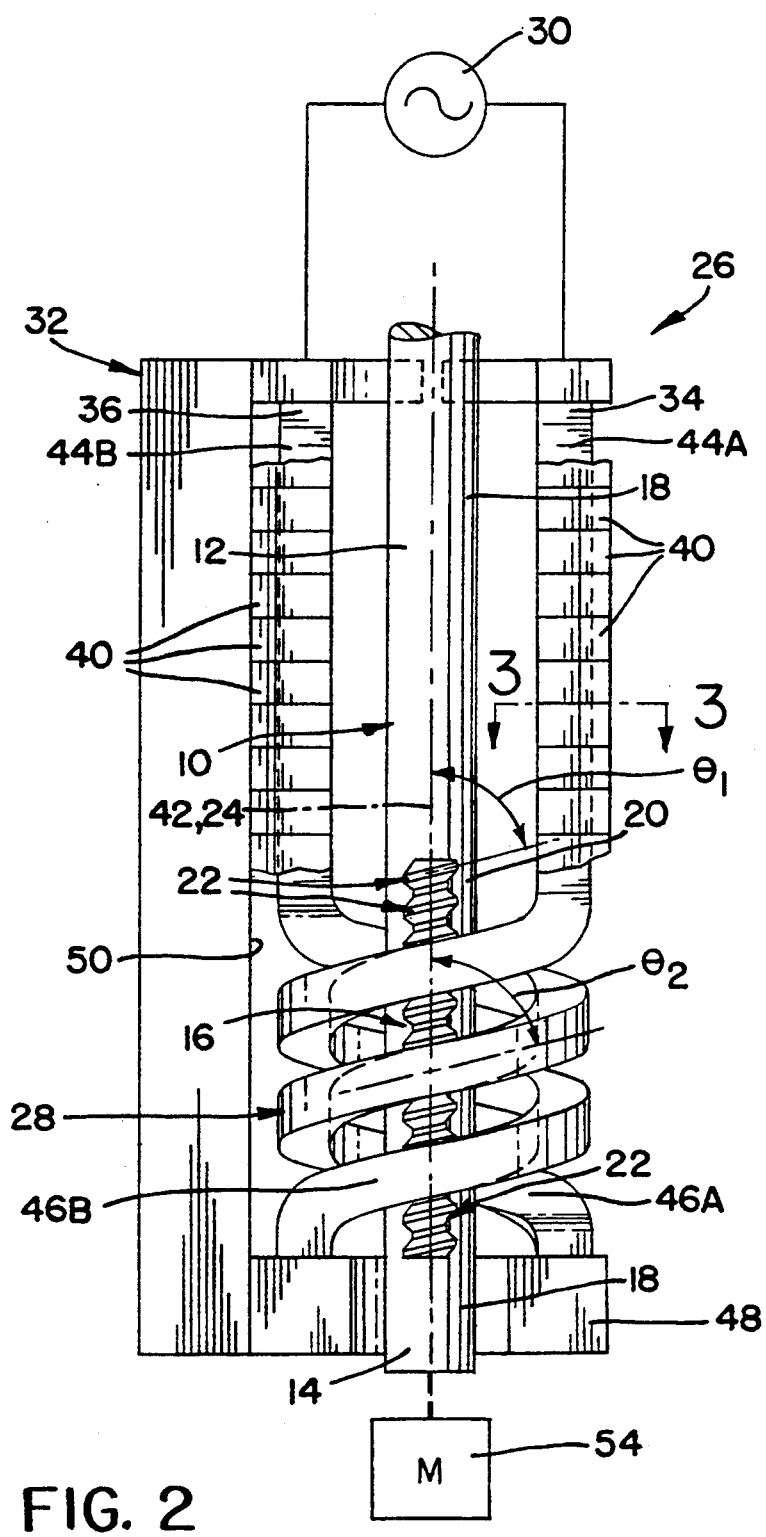
FIG. 2 is a partially broken-away view taken generally along the plane indicated by lines 2—2 in FIG. 1.

The induction coil 28 includes a pair of linear sections 44A–B each parallel to the longitudinal centerline 42. The induction coil 28 further includes a pair of spiral sections 46A–B forming a double helix around the centerline 42. The ends of the spiral sections 46A–B opposite the linear sections 44A–B are electrically connected by a bridge 48 which forms a half-loop around the short barrel portion 14 of the rack bar. As seen best in FIG. 2, the spiral sections 46A–B of the induction coil have a helix angle $\Theta_2$ which is equal to the helix angle $\Theta_1$ of the rack gear teeth 22 on the rack bar. The quench manifold 32 has a first side 50 outside of the induction coil 28 parallel to the centerline 42 thereof and a second side, not shown, outside of the induction coil on the opposite side of the latter parallel to the first side 50. Each of the first and second sides of the quench manifold has a matrix of coolant jets 52 aimed at the centerline 42 of the coil. Quench liquid supplied by a pump, not shown, to both sides of the manifold 32 issues therefrom as streams from the jets 52 directed toward the centerline 42 of the induction coil.

The case hardening method according to this invention consists of the following steps. The rack bar 10 is mounted or fixtured inside of the induction coil 28, FIGS. 1-2, with the longitudinal centerline 24 of the rack bar coincident with the longitudinal centerline 42 of the induction coil. The linear sections 44A-B of the induction coil are parallel to and juxtaposed the long barrel portion 12 of the rack bar. The bridge 48 of the induction coil is coextensive with the short barrel portion 14 of the rack bar and envelopes about one half of the circumference thereof. The spiral sections 46A-B of the induction coil surround the toothed portion 16 of the rack bar. The lower end of the rack bar is connected to a motor 54 which rotates the rack bar within the induction coil about the coincident longitudinal centerlines 42, 24 of the coil and the rack bar.

Figure 4A:
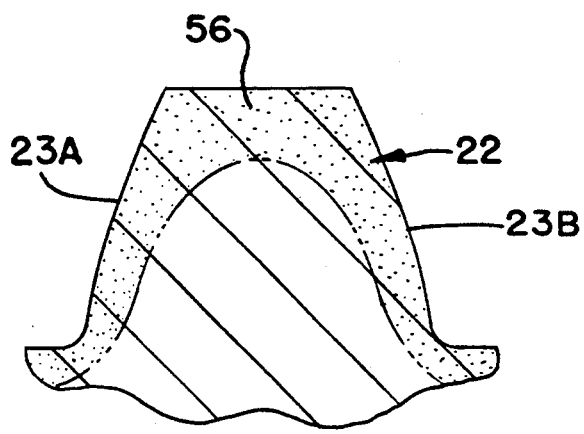
FIGS. 4A–4C are fragmentary sectional views of a tooth portion of a rack bar case hardened by the case hardening method according to this invention showing the tooth portion during different steps of the method.

With the rack bar rotating inside the induction coil, the power supply 30 is turned on to initiate a first or low power density heating cycle to induce an electric current in the barrel portions 12, 14 and in the tooth portion 16 of the rack bar. The induced current follows the plain cylindrical surfaces 18 of the barrel portions 12, 14 and the plain cylindrical surface 20 of the toothed portion and raises the temperature of thin, high temperature layers thereof, not shown, in the usual fashion. Importantly, because the helix angle $\Theta_2$ of the spiral sections 46A-B of the induction coil is the same as the helix angle $\Theta_1$ of the rack gear teeth, the induced electric current also closely follows the flank surfaces 23A-B of the rack gear teeth 22 and, therefore, raises the temperature of a thin, high temperature layer 56 of the toothed portion 16, FIG. 4A, which relatively closely follows the flank surfaces. In an experimental demonstration, the low power density heating cycle achieved a temperature of 1000°-1200° F. in the high temperature layer 0.080 inch with the power supply 30 operating at 170 Kw at a frequency of 300 KHz for 7.0 seconds.

Figure 4B:
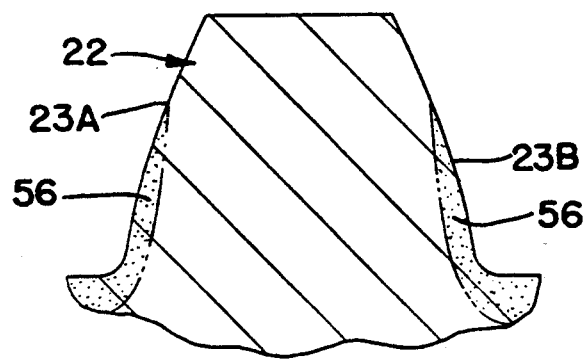

After the low power density heating cycle, the power supply is turned off to permit the rack bar to soak. During soaking, heat from the high temperature layers dissipates into the rack bar and radiates into the atmosphere around the rack bar so that the high temperature layer 56 becomes interrupted generally along the flank surfaces 23A-B of the rack gear teeth 22 near the ends of the teeth, FIG. 4B. In the aforesaid experimental demonstration, the duration of soak was 10-12 seconds.

Figure 4C:
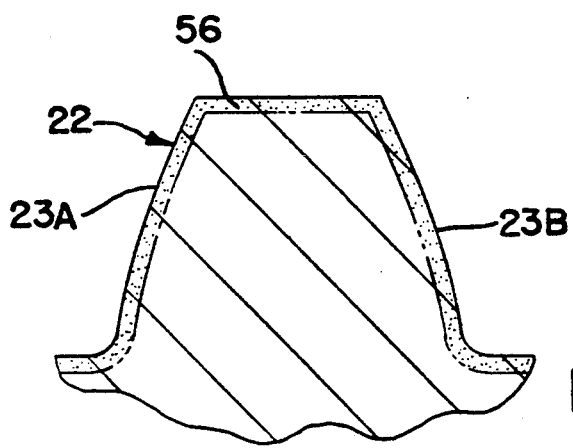

With the rack bar still rotating, the power supply 30 is turned on to initiate a second or high power density heating cycle which induces electric current in the barrel portions 12, 14 and in the tooth portion 16 of the rack bar. As during the low power density cycle, the induced current follows the plain cylindrical surfaces 18 of the barrel portions 12, 14 and the plain cylindrical surface 20 of the toothed portion 16 and, because the helix angles $\Theta_1$, $\Theta_2$ are the same, also closely follows the flank surfaces 23A-B of the rack gear teeth 22. Accordingly, the high temperature layer 56 is fully reconstituted, FIG. 4C, and, because of the higher power density, achieves a predetermined high temperature adequate for case hardening. In the aforesaid experimental demonstration, the high power density heating cycle achieved a temperature of 1800° F. in the high temperature layer 0.050 inch with the power supply 30 operating at 400 Kw at a frequency of 300 KHz for 0.6-0.8 seconds.

At the conclusion of the high power density cycle and with the rack bar still rotating, the power supply 30 is turned off and the supply of quench liquid to the manifold 32 is turned on. A plurality of coolant streams issue from the jets 52 to substantially instantly bathe the rack bar 10 in quench liquid whereby the steel in the high temperature layer 56 and the corresponding high temperature layers in the barrel portions 12, 14 of the rack bar undergo transformation to a hard case. After quench, the rack bar is removed from the induction coil 28 and processed like prior rack bars through steps which include straightening, tempering, and grinding.

It will be apparent to those skilled in the art that the shape of the induction coil 28 around the long barrel portion 12 of the rack bar depends on the heating requirements of the toothed portion 16 of the rack bar. That is, the power level and duration of the high and low power density cycles are calculated to achieve a predetermined high temperature in the high temperature layer 56 in the toothed portion of the rack bar using an induction coil having the spiral sections 46A-B around the toothed portion. That same coil configuration, if extended to cover the barrel portion 12 too, could induce an electric current which could overheat the barrel portion. Therefore, the exposure of the long barrel portion of the rack bar to the induction coil is reduced by constructing the induction coil such that the long barrel portion 12 is exposed only to the linear sections 44A-B of the coil.

The embodiments of the invention in which an exclusive property or privilege is claimed are defined as follows:

1. A method of case hardening a steering gear rack bar having a longitudinal centerline, a barrel portion with an uninterrupted cylindrical surface, and a toothed portion having a cylindrical surface contiguous with said uninterrupted cylindrical surface and interrupted by a plurality of rack gear teeth each having a pair of flank surfaces on opposite sides thereof and a rack gear tooth helix angle relative to said longitudinal centerline of said rack bar comprising the steps of:

forming an induction coil including a linear section parallel to a longitudinal centerline of said induction coil and a spiral section around said centerline of said induction coil having a coil helix angle relative to said longitudinal centerline of said induction coil substantially equal to said rack gear tooth helix angle, mounting said rack bar inside of said induction coil with said longitudinal centerline of said rack bar coinciding with said longitudinal centerline of said induction coil and with said barrel portion of said rack bar juxtaposed and parallel to said linear section of said induction coil and said toothed portion of said rack bar surrounded by said spiral section of said induction coil, rotating said steel bar about said coincident longitudinal centerlines of said induction coil and said rack bar, concurrently induction heating said barrel portion and said toothed portion of said rack bar by passing alternating electric current through said induction coil so that a thin high temperature layer is formed on said rack bar which follows said uninterrupted cylindrical surfaces of said barrel portion and of said tooth portion and which also follows said flank surfaces of said rack gear teeth, and quenching said induction heated rack bar.

2. A method of case hardening a steering gear rack bar having a longitudinal centerline, a barrel portion with an uninterrupted cylindrical surface, and a toothed portion having a cylindrical surface contiguous with said uninterrupted cylindrical surface and interrupted by a plurality of rack gear teeth each having a pair of flank surfaces on opposite sides thereof and a rack gear tooth helix angle relative to said longitudinal centerline of said rack bar comprising said steps of:

forming an induction coil including a pair linear sections parallel to a longitudinal centerline of said induction coil and a pair of spiral sections around said centerline of said induction coil defining a double helix having a coil helix angle relative to said longitudinal centerline of said induction coil substantially equal to said rack gear tooth helix angle, mounting said rack bar inside of said induction coil with said longitudinal centerline of said rack bar coinciding with said longitudinal centerline of said induction coil and with said barrel portion of said rack bar between and parallel to said pair of linear sections of said induction coil and said toothed portion of said rack bar surrounded by said pair of spiral sections of said induction coil, rotating said steel bar about said coincident longitudinal centerlines of said induction coil and said rack bar, concurrently induction heating said barrel portion and said toothed portion of said rack bar by passing alternating electric current through said induction coil so that a thin high temperature layer is formed on said rack bar which follows said cylindrical surfaces of said barrel portion and of said tooth portion and which also follows said flank surfaces of said rack gear teeth, and quenching said induction heated rack bar.

3. The method of case hardening a steering gear rack bar recited in claim 2 wherein the step of concurrently induction heating said barrel portion and said toothed portion of said rack bar by passing alternating electric current through said induction coil includes the steps of:

passing alternating electric current through said induction coil in a low power density cycle for a first time duration to form a thin high temperature layer in said rack bar following said cylindrical surfaces of said barrel portion and said toothed portion and said flank surfaces of said rack gear teeth, terminating the passage of electric current through said induction coil for a soak duration so that said thin high temperature layer is interrupted generally along said flank surfaces of said rack gear teeth, and passing alternating electric current through said induction coil in a high power density cycle for a second time duration less than said first time duration to fully reconstitute said thin high temperature layer along said flank surfaces of said rack gear teeth.

* * * * *